United States Patent Office 3,262,963
Patented July 26, 1966

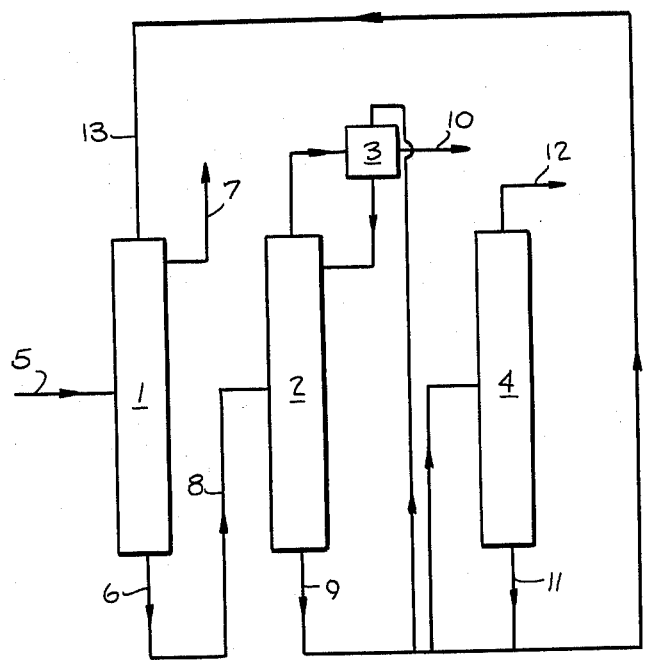

3,262,963
ACRYLONITRILE SEPARATION
Jacques Modiano and Francis Weiss, Pierre Benite (Rhone), France, assignors to Societe d'Electro-Chimie d'Electro-Metallurgie et des Acieries Electriques d'Ugine, Paris, France, a corporation of France
Filed July 9, 1963, Ser. No. 293,777
Claims priority, application France, July 20, 1962, 904,637; Nov. 29, 1962, 917,009
7 Claims. (Cl. 260—465.3)

The present invention relates to a process for the separation of components of a gaseous mixture containing acrylonitrile and resulting from the catalytic oxidation of propylene in the presence of ammonia.

The vapor phase catalytic oxidation of propylene in the presence of ammonia to produce acrylonitrile is well known. Many methods of carrying out this reaction are known which differ one from the other by such features as the composition of the gaseous feed, the reaction temperature, the contact time and the nature of the catalyst. These various methods all produce gaseous mixtures which contain generally besides acrylonitrile a certain number of compounds resulting from secondary reactions such as acetonitrile, acrolein, hydrogen cyanide, carbon dioxide and carbon monoxide, and accompanying these an excess of the reactants, e.g. propylene, ammonia, air and possibly steam. It is necessary to separate these various components from the gaseous mixture and to isolate the desired products and to recycle some of the residue, in particular the ammonia. The method usually employed for this purpose consists in washing the gases leaving the reactor with a solution of sulfuric acid which eliminates the ammonia, absorbing the organic products in water and then by series of distillations, some of which may be extractive, separating the acrylonitrile from the other organic products. By this method ammonia is recovered in the state of ammonium sulfate which is of little commercial value although it could be treated in order to liberate the ammonia which could then be recycled to the reaction. In view however of the high consumption of sulfuric acid by this method this process is economically unattractive.

It is an object of the present invention to provide a method for the treatment of gaseous mixtures resulting from the catalytic oxidation of propylene in the presence of ammonia and for the recovery from such mixtures of for example acrylonitrile, hydrogen cyanide, acrolein and ammonia.

Accordingly, the present invention comprises a process for the separation and recovery of the components of a gaseous mixture containing acrylonitrile and ammonia, and resulting from the vapor phase catalytic oxidation of propylene in the presence of ammonia which comprises washing the mixture with an aqueous solution of an organic acid having a concentration sufficient to neutralize free ammonia and to produce a solution of the organic components of the mixture, distilling the aqueous solution so obtained under such conditions as to remove the organic components as an overhead distillate and an aqueous solution of substantially undecomposed ammonium salts of the organic acid as base product, and decomposing at least a part of the base product to liberate ammonia and produce an aqueous solution of the free organic acid.

The organic acid employed is suitably one which is not easily entrained by the water either because of the closeness of the boiling point to that of water or because of its formation of aqueous azeotropes and the ammonium salts of which decompose on heating to produce a mixture of ammonia and water, e.g. acetic or citric acids.

The aqueous solution of organic acid should preferably have a pH of less than 6.5 so as to avoid polymerization or other undesirable reaction taking place with the organic components of the reaction mixture which will affect the yield of their ultimate recovery. The pH of the solution may be maintained without difficulty by suitable adjustment of the flow of the acid solution as well as of its organic acid content. Moreover, the flow of the washing solution and its temperature should be such that the organic components, e.g. acrylonitrile, hydrocyanic acid, acrolein and acetonitrile are maintained in solution while at the same time the ammonia is being absorbed. This condition may be realized by any suitable method e.g. by maintaining the gas/liquid mixture at a temperature below 20° C. and preferably at about 10° C. during its passage through the installation where the gases are neutralized and absorbed.

The concentration and rate of flow of the washing solution are also preferably controlled to obtain a concentration of the ammonium salt of the organic acid employed in the washing solution after contact with the gases of suitably between 5 and 50% based on the total weight of the solution.

The aqueous solution obtained after washing the reaction gases contains the dissolved organic components as well as the ammonium salt of the organic acid employed. This solution is then subjected to distillation to recover the organic components. For this purpose a distillation is carried out under such conditions that no substantial decomposition of the ammonium salt takes place but so that all the organic components are obtained as an overhead distillate from the distillation column. These conditions can be realized by variation of the temperature and pressure of the distillation. For example the temperature of the distillation may suitably be maintained between 30 and 90° C., and preferably between 45 and 65° C. The pressure at which the distillation is carried out is chosen in accordance with the temperature conditions and is preferably under reduced pressure. The gases leaving the solution during distillation may also be scrubbed with acid salt solution before condensation in the upper portion of the column.

The separate organic compounds may be recovered from the overhead organic fraction and be purified by known methods e.g. fractional distillation.

A part or all of the aqueous solution removed as base product from the distillation column and containing the ammonium salt of the organic acid is finally heated to decompose the salt and to liberate free ammonia. This solution usually has a pH of less than 7 and contains practically no more organic material. The decomposition can be carried out by heating at atmospheric or super-atmospheric pressure. It is possible to carry out the decomposition under such conditions that the ammonia liberated corresponds in quantity very nearly precisely to the amount originally present in the reaction product gases. Moreover it is also possible to distil off at the same time as the ammonia a quantity of steam, equal to or at least very close to that required for feeding to the reaction. This ammonia in addition to necessary fresh make-up ammonia and steam may be recycled to the catalytic reaction for the oxidation of propylene.

The aqueous solution of organic acid remaining after liberation of the ammonia, provided the recycle operation is suitable controlled, is substantially identical with that which has served to neutralize and scrub the gases issuing from the catalytic reaction. It may therefore be recycled in its entirety to the scrubbing plant.

The process of the present invention is illustrated further with reference to the following examples in association with the accompanying drawing which illustrates schematically a flow sheet for the process.

Example 1

Referring to the accompanying flow sheet, 1 is a column in which the neutralization and absorption of the gases coming from the catalytic reaction are carried out. 2 is a distillation column operating at reduced pressure. At the head of this column the useful organic constituents are drawn off, and at the bottom the acid solution of the ammonium salt. The traces of ammonia which the overhead product may contain are neutralized and eliminated at 3 by a portion of the acid salt solution drawn off the bottom of column 2 through line 9. 4 is a column in which the decomposition of the ammonium salt contained in the whole, or in a part of the solution drawn off the bottom of column 2 takes place. At the head of column 4 an ammonia/steam mixture is drawn off and returned to the catalytic reactor. The liquid drawn off the bottom of column 4 and containing a large proportion of free acid is recycled to column 1 with the remainder of the non-decomposed solution drawn off the bottom of column 2.

The organic acid chosen in this example is acetic acid.

One thousand cubic metres/hour of a gas coming from the catalytic reactors in which the oxidation of propylene to acrylonitrile in the presence of ammonia was carried out, were passed through line 5 into column 1 after having been cooled to 100° C. Their composition by volume was about as follows:

|  | Percent |
|---|---|
| Acrylonitrile | 3 |
| Other useful organic products: hydrocyanic acid, acrolein, acetonitrile | 0.9 |
| Ammonia | 1.9 |
| Steam | 36.3 |
| $CO_2$, CO, $O_2$, $N_2$, etc. | 58 |

These gases were absorbed and neutralized by 1,850 kg./hour of solution I introduced through line 13 and containing by weight:

|  | Percent |
|---|---|
| Acetic acid | 2.8 |
| Ammonium acetate | 42 |
| Water | 45.2 |

2,136 kg./hour of solution II were drawn off through line 6, containing by weight:

|  | Percent |
|---|---|
| Acrylonitrile | 2.5 |
| Other organic products: hydrocyanic acid, acrolein, acetonitrile | 0.43 |
| Acetic acid | 0.73 |
| Ammonium acetate | 38.6 |
| Water | 57.75 |

The non-dissolved gases, especially CO, $CO_2$, $N_2$, $O_2$, escaped through line 7.

A temperature of 9° C. was maintained in column 1 which permitted a recovery yield of the organic products of more than 99.5%.

Solution II was introduced into the distillation column 2 through line 8 and subjected in this column to an absolute pressure of 100 mm. of mercury. The temperature was maintained at the bottom of column 2 at 59° ±1° C. and at the top at 25° C.±1° C. Under these conditions decomposition of the ammonium acetate was extremely small and it was sufficient to wash the distillate in unit 3 with 50 kg./hr. of solution III drawn off the bottom of column 2 through line 9 to obtain, at the exit 10 of unit 3, 65.7 kg./hour of neutral crude acrylonitrile of the following composition:

|  | Percent |
|---|---|
| Acrylonitrile | 81.2 |
| Other organic products | 13.9 |
| Water | 4.9 |

From the bottom of column 2, 2070.23 kg./hour of a solution III were drawn off which contained:

|  | Percent |
|---|---|
| Acetic acid | 0.75 |
| Ammonium acetate | 39.7 |
| Water | 59.55 |
| Organic products | Traces |

840 kg./hour of this solution III were passed into a distillation column 4 working at atmospheric pressure, where the decomposition of ammonium acetate was carried out.

The temperature at the bottom of column 4 was 108° C. ±1° C. which permitted distillation overhead of 221.8 kg./hour of an ammonia/steam mixture containing by weight:

|  | Percent |
|---|---|
| Ammonia | 4.6 |
| Organic products | Traces |
| Steam | 95.4 |

This mixture was completely recycled to the catalytic reactor.

From the bottom of column 4 through line 11, 618.2 kg./hour of a mixture of the following composition was drawn off:

|  | Percent |
|---|---|
| Acetic acid | 6.9 |
| Ammonium acetate | 45.9 |
| Water | 47.2 |

This solution increased by 1230.3 kg./hour of the non-treated solution III was returned to column 1 and ensured the neutralization and absorption of the useful organic products coming from the catalytic reactor.

Pure polymerizable acrylonitrile was obtained by treatment according to known processes of the mixture drawn off at 10. Moreover pure hydrocyanic acid, acrolein, and acetonitrile may also be obtained.

Example 2

The same arrangement as described in Example 1 was used.

The same quantity (1000 m.³/hr.) of a gas of the same composition as that described in Example 1 was introduced through line 5 into column 1 where it was neutralized and washed with 3,850 kg./hr. of an aqueous solution (I) containing:

|  | Percent |
|---|---|
| Neutral ammonium citrate $C_6H_5O_7(NH_4)_3$ | 40 |
| Acid ammonium citrate $C_6H_6O_7(NH_4)_2$ | 4.6 |
| Water | 55.4 |

The insoluble gases were drawn off at 7 and at 6 4,136 kg./hr. of a solution IIa, containing:

|  | Percent |
|---|---|
| Acrylonitrile | 1.29 |
| Other organic products: hydrocyanic acid, acrolein, acetonitrile | 0.22 |
| Neutral ammonium citrate | 40.7 |
| Acid ammonium citrate | 0.99 | were removed from the column.

A temporary of 8° C. was maintained in column 1 so as to ensure recovery yields of the organic products of greater than 99.5%.

The solution IIa entered the distillation column 2 through line 8 where it was subjected to an absolute pressure of 110 mm. of mercury. The temperature at the bottom was 62° C.±1° C. and that at the top 27±1° C.

Under these conditions decomposition of ammonium citrate was very small and it was sufficient to wash the distillate at 3 with 30 kg./hr. of solution IIIa drawn off at the bottom 9 of column 2 to obtain at the exit 10

65.5 kg./hour of crude acylonitrile of the following composition:

| | Percent |
|---|---|
| Acrylonitrile | 81.4 |
| Other organic products | 14.0 |
| Water | 4.6 |

4,070.5 kg./hr. of a solution IIIa was drawn off through line 9 which contained only traces of organic products and which was made up of

| | Percent |
|---|---|
| Neutral ammonium citrate | 41.4 |
| Acid ammonium citrate | 1.02 |
| Water | 57.58 |

1,920 kg./hr. of this solution IIIa was passed into the distillation column 4 working at an absolute pressure of 1.3 kg./cm.$^2$ in which the neutral ammonium citrate was decomposed.

The temperature at the bottom of this column was 114° C. which allowed distillation at the top of 221.8 kg./hr. of an ammonia/steam mixture containing besides traces of organic products:

| | Percent |
|---|---|
| Ammonia | 4.6 |
| Water | 95.4 |

This mixture was completely recycled to the catalytic reactor.

From the bottom 11 of column 4 1,698.2 kg./hr. of a mixture of the following composition was withdrawn.

| | Percent |
|---|---|
| Neutral ammonium citrate | 38.2 |
| Acid ammonium citrate | 9.14 |
| Water | 52.66 |

The solution increased by 2,150.5 kg. of non-treated solution IIIa was returned to column 1 and ensured neutralization and absorption of the useful organic products deriving from the catalytic reactor.

The crude acrylonitrile was treated in accordance with known processes and pure polymerizable acrylonitrile was obtained by suitable treatment according to known process of the mixture drawn off at 10. Furthermore pure hydrocyanic acid, acrolein and acetonitrile may be obtained.

*Example 3*

The same arrangement as described in Example 1 was used.

One thousand cubic metres/hour of a gas, coming from a catalytic reactor in which the oxidation of propylene to acrylonitrile in the presence of ammonia was carried out, were taken to the absorption column 1 after having been cooled to 100° C. Their composition by volume was as follows:

| | Percent |
|---|---|
| Acrylonitrile | 4.1 |
| Other useful organic products: Hydrocyanic acid, acrolein, acetonitrile | 0.5 |
| NH$_3$ | 0.9 |
| Steam | 22 |
| CO$_2$, CO, O$_2$, N$_2$, etc. | 72.5 |

These gases were absorbed and neutralized by 2148 kg./hr. of a solution (I) containing by weight:

| | Percent |
|---|---|
| Acetic acid | 2.4 |
| Ammonium acetate | 36 |
| Water | 61.6 |

At the bottom of the column 1 2,357 kg. of a solution (II) was withdrawn through 6 with the following composition by weight:

| | Percent |
|---|---|
| Acrylonitrile | 3.14 |
| Other organic products: hydrocyanic acid, acrolein, acetonitrile | 0.24 |
| Acetic acid | 1.42 |
| Ammonium acetate | 33.7 |
| Water | 61.5 |

The non-dissolved gases, in particular CO, CO$_2$, N$_2$, O$_2$, escaped at the top of the column through line 7. A temperature of 6° C. was maintained in column 1 which assured a recovery yield of the organic products of over 99.5%.

Solution (II) was introduced to the distillation column 2 where it was subjected to an absolute pressure of 100 mm. of mercury. The temperature was maintained at the bottom at 59° C. ±1° C. and at the top at 25° C. ±1° C. Under these conditions decomposition of the ammonium acetate was very small and it was sufficient subsequently to wash the distillate in 3 with 30 kg./hr. of the solution (III) drawn off the bottom of the distillation column in order to obtain after this wash 80 kg./hr. of crude neutral acrylonitrile of the following composition:

| | Percent |
|---|---|
| Acrylonitrile | 88.9 |
| Other organic products | 7.1 |
| Water | 4 |

At the bottom of the distillation column 2,277 kg. of a solution (III) were withdrawn which contains:

| | Percent |
|---|---|
| Acetic acid | 1.49 |
| Ammonium acetate | 35.1 |
| Water | 63.41 |
| Organic products | Traces |

1,040 kg./hr. of this solution (III) were passed to column 4 working at an absolute pressure of 1.6 kg./cm.$^2$ in which decomposition of the ammonium acetate was effected.

The temperature at the bottom of this column was 119° C. ±1° C. which allowed distillation at the top of 135 kg./hr. of an ammonia/steam mixture containing by weight:

| | Percent |
|---|---|
| Ammonia | 3.7 |
| Organic products | Traces |
| Steam | 96.4 |

This mixture was completely recycled to the catalytic reactor through line 12.

From the bottom of the column 4 905 kg./hr. of a mixture of the following composition was withdrawn:

| | Percent |
|---|---|
| Acetic acid | 3.66 |
| Ammonium acetate | 48.8 |
| Water | 47.54 |

This solution, increased by 1,237 kg./hr. of non-treated solution (III) was returned to column 1 to ensure neutralization and absorption of the useful products coming from the catalytic reactor.

What we claim is:
1. In a catalytic process for producing acrylonitrile by reaction between ammonia, oxygen and propylene to produce a gaseous reaction mixture containing acrylonitrile and ammonia the improvement of removing said ammonia which comprises the steps of cooling the gaseous reaction mixture, washing the mixture at a temperature below 20° C. with an aqueous solution of an organic acid selected from the group consisting of acetic acid and citric acid to produce a wash solution containing the ammonium salt of said acid in a concentration of from about 5% to about 50% by weight based on the total weight of the solution, removing said acrylonitrile by distillation at a temperature between 30° and 90° C. and thereafter heating the residual wash solution to a temperature above 90° C. to thermally decompose said ammonium salt, recycling said ammonia to the initial reaction zone and recyling said acid, in its entirety to said washing solution.

2. A process as claimed in claim 1 wherein the organic acid is acetic acid.

3. A process as claimed in claim 1 wherein the organic acid is citric acid.

4. A process as claimed in claim 1 wherein the washing is carried out at about 10° C.

5. A process as claimed in claim 1 wherein the distillation step is carried out under reduced pressure.

6. A process as claimed in claim 1 wherein the gases leaving solution during the distillation step are scrubbed with a salt solution of said organic acid before condensation in the upper portion of the distillation column.

7. A process as claimed in claim 1 wherein the thermal decomposition step is so carried out as to effect liberation of substantially the same amount of ammonia vapor as was present in the original gaseous mixture.

References Cited by the Examiner

UNITED STATES PATENTS

| | | | |
|---|---|---|---|
| 2,389,607 | 11/1945 | Britton et al. | 260—465.9 |
| 2,691,037 | 10/1954 | Bellringer et al. | 260—465.9 |
| 2,836,614 | 5/1958 | Bewley | 260—465.9 |
| 2,987,451 | 6/1961 | Sennewald et al. | 260—465.9 X |
| 3,009,943 | 11/1961 | Hadley et al | 260—465.3 |
| 3,073,753 | 1/1963 | Hadley et al. | 260—465.9 X |
| 3,152,170 | 10/1964 | Barclay et al. | 260—465.3 |
| 3,155,601 | 11/1964 | Idol | 260—465.3 X |

OTHER REFERENCES

Ephraim: "Inorganic Chemistry," 1954, pages 642–647.

CHARLES B. PARKER, *Primary Examiner.*

JOSEPH P. BRUST, *Assistant Examiner.*